: 3,156,723
Patented Nov. 10, 1964

3,156,723
FORMATION OF OXIMES FROM α-NITROOLEFINS
Wolfgang K. Seifert, Berkeley, Calif., assignor to California Research Corporation, San Francisco, Calif., a corporation of Delaware
No Drawing. Filed Oct. 26, 1961, Ser. No. 147,738
7 Claims. (Cl. 260—566)

This invention relates to a novel method of producing aliphatic oximes. More particularly this invention relates to a novel method of reducing aliphatic nitroolefins to oximes.

With the general availability of a large variety of olefins, it has become increasingly significant to find means of transforming olefins into other valuable compounds. Since oximes can be readily transformed into amides and lactams by Beckmann rearrangement, a route from an olefin to the amide or lactam is of commercial interest.

It has now been found that an α-nitroolefin may be reduced selectively in excellent yield to the corresponding oxime. The process comprises reducing the α-nitroolefin with hydrogen in the presence of a palladium catalyst in an acidic alcohol solvent. The combined yield of oxime and carbonyl compound, which usually is formed concurrently and is readily transformed into the oxime, is generally in excess of 85%, based on the weight of starting olefin. As nitroolefins theoretically may be reduced to amines, hydroxylamines, azoxy compounds, etc., and mixtures thereof, it is quite significant that the oxime is obtained in excellent yield.

Any aliphatic α-nitro compound may be used in the process of the invention; e.g., acyclic or alicyclic hydrocarbons. By α-nitroolefin is intended the vinyl nitro group, i.e.,

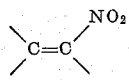

the alpha indicating the position of the double bond in relation to the nitro group. The alicyclic α-nitroolefins are preferred because the lactams derivable from the oxime find ready use in polymers. For reasons of availability, compounds not in excess of 20 carbon atoms are preferred; particularly preferred are cyclic compounds of up to and including 12 carbon atoms.

Alpha-nitroolefins which are operable in this invention are nitroethylene, 2-nitropropene, 1-nitroeicosene, 1-nitrododecene, 1-nitrooctadecene, 2-nitrooctene-2, 1-nitrocyclopentene, 1-nitrocyclohexene, 1-nitrocyclooctene, 1-nitrocyclodecene, 1-nitrocyclododecene, etc. These compounds are merely illustrative of the variety of compounds that may be used in this invention.

It is not essential that the α-nitroolefins be straight-chain olefins or that there be only the one site of aliphatic unsaturation which is in conjugation with the nitro group. However, the monoolefin compounds will generally be preferred and to the extent that straight chain olefins are generally more available, the straight chain compounds are preferred.

In the process of the invention any strong acid may be used which is stable under the conditions of the reaction and does not poison the catalyst. The usual acids will be mineral acids, e.g., sulfuric, hydrochloric, phosphoric, etc., because of their ready availability.

The amount of mineral acid may vary from 0.02–2 moles/mole of α-nitroolefin, preferably from 0.1–1.0. The reaction is run conveniently at approximately room temperature. No advantage is obtained by a significant increase or decrease in temperature, while a significantly higher temperature may change the course of the reaction.

A palladium type catalyst is necessary to the invention. Any of the common supports, such as charcoal, alumina, barium sulfate, etc., may be used. Using a 5% palladium on charcoal catalyst, the amount of palladium may vary from approximately 1 to 10% by weight based on the weight of nitroolefin. The time may also be varied, but will be generally dependent on when the absorption of hydrogen ceases. There is no advantage in unduly prolonging the reaction time, for usually the absorption of hydrogen will be complete within a few hours.

Alcoholic solvents should be used, which will generally be lower alkanols, methanol being preferred.

Any convenient or suitable apparatus may be used which is inert to the reactants and able to withstand the mild pressures. The reaction may be run batchwise or as a continuous operation.

The invention is illustrated further by means of the following examples.

EXAMPLE I

A 3.255 g. of catalyst (5% Pd on C) was suspended in 175 ml. of methanol containing 35 mmoles (mM.) of HCl, was prehydrogenated in a 510-ml. bottle, and then 5.43 g. (35 mM.) of 1-nitrocyclooctene as prepared in Example A and about 50 p.s.i. of hydrogen introduced. After 5 minutes the hydrogen curve showed a sharp break and after 21 minutes, 2.05 moles of hydrogen per mole of nitroolefin (77.4 p.s.i.) had been consumed. Addition of 35 mM. of sodium acetate was followed by filtration and methanol extraction of the catalyst. The united methanol solutions were vacuum concentrated to about 20 ml. After addition of 200 ml. of water, ether extraction, washing of the ethereal solution with sodium-bicarbonate solution and water, and vacuum evaporation of the ether and water, 4.61 g. (96%) of crude product was obtained which analyzed (IR) for 80–83 mole percent oxime and 17 mole percent ketone. An aliquot of the mixture was withdrawn and microdistillation yielded 74–78% oxime and 16% ketone. The IR spectrum of the oxime was identical with an authentic sample (B.P.: 63° C./0.08 mm., M.P.: 41.7–42.7° C.).

Analysis.—Calculated for $C_8H_{15}NO$: C, 67.99; H, 10.71; N, 9.92. Found: C, 67.66; H, 10.42; N, 9.69.

The cyclooctanone was also isolated by vapor phase chromatography and identified.

EXAMPLE II

A suspension of 4.6 g. of catalyst (5% Pd on C) in 232 ml. of methanol which contained 25 mM. of $H_2SO_4$ was prehydrogenated in a 510-ml. bottle, 8.33 g. of 93% 1-nitrocyclooctene (0.05 mole) were added and about 50 p.s.i. of hydrogen was charged. After 11 minutes the hydrogen curve showed a sharp break.

After working up the product as described in Example I, a crude yield of 6.5 g. was obtained consisting of 23% ketone and 70% oxime, yield: 87% of theory.

A mixture of 4.05 g. of this crude product (containing 7–8 mM. of cyclooctanone), 2.78 g. (40 mM.) of hydroxylamine hydrochloride, 10.8 g. (80 mM.) of sodium acetatetrihydrate, 40 ml. of methanol, and 15 ml. of water was kept at 50° C. for 40 minutes. After workup as described for cyclooctanoneoxime and drying the product for 24 hours on the oil pump, 3.76 g. (91% of the theory) of product was obtained which analyzed for 88–93% cyclooctanoneoxime and 0% cyclooctanone.

The following examples were carried out in conformance with Example I.

TABLE I

| Example | HCl/Nitro-olefin | Percent Yield a | Total Time (Hours) | Percent Pd b |
|---------|------------------|-----------------|--------------------|--------------| 
| III     | 0.5              | 81              | 0.6                | 7.6          |
| IV      | 1                | 94              | 0.15               | 3.0          | a Based on the total amount of cyclooctanone oxime and cyclooctanone as determined by IR analysis.
b Calculated on nitroolefin using 5% Pd on C.

EXAMPLE V

A mixture of 5% palladium on charcoal (0.18 g.) and 1 mmole HCl in methanol (10 ml.) was prehydrogenated, 0.59 g. of 1-nitrooctadecene added and approximately 40 p.s.i. of hydrogen charged. After approximately 40 minutes the absorption of hydrogen ceased. Addition of 2 mM. of sodium acetatetrihydrate was followed by filtration, extraction of the catalyst with methanol, concentration by vacuum evaporation, addition of aqueous sodium carbonate, and repeated extraction with ether. The ether was removed in vacuum yielding 0.53 g. of crude material which analyzed for 73% stearaldoxime (70% of theoretical amount).

EXAMPLE A

*Preparation of 1-Nitrocyclooctene*

Cyclooctene (44.4 g., 0.40 mole), which contained 4.6% cyclooctane, was added to a solution of 39.28 g. (0.427 mole) of $N_2O_4$ in 150 ml. of dry ether during 24 minutes at 9–12° C. while bubbling 13 mM. of oxygen through the solution. After addition of 25 ml. of ether and stirring of the yellow solution for 0.5 hour at 10° C., 1.2 moles of triethylamine was added at 4–12° C. The mixture was kept at 24° C. for 0.5 hours, cooled to —3° C., diluted with 150 ml. of ether, and quenched with 1.2 moles of acetic acid and 200 ml. of water. The mixture was extracted with ether; the ethereal solution was washed twice with water, twice with sodium bicarbonate and three additional times with water. After vacuum evaporation of the ether, 61.0 g. of a yellow oil remained which contained (quantitative IR) 93% 1-nitrocyclooctene (about 95% of the theory).

*Analysis.*—$C_8H_{13}NO_2$ (155.19). Calculated: C, 61.91; H, 8.44; N, 9.03. Found: C, 61.84, 61.75; H, 8.27, 8.30; N, 8.80.

The carbonyl compound, i.e., ketone or aldehyde, formed in the reduction may be directly transformed into the oxime as described in Example II or may be separated by any of the usual methods and subsequently transformed into the oxime.

Isolation and purification of the oxime may be done by any of the usual methods known in the art, e.g., distillation, crystallization, etc.

Obviously, many modifications and variations of the invention, as hereinabove set forth, may be made without departing from the spirit and scope thereof, and therefore only such limitations should be imposed as are indicated in the appended claims.

I claim:

1. Process for the preparation of oximes which comprises reducing at room temperature an unsubstituted α-nitroolefin selected from the group consisting of acyclic and alicyclic monoolefinic hydrocarbons with hydrogen in the presence of from about 1 to 10% by weight based on the weight of said α-nitroolefin of palladium in lower alkanol solvent having from 0.2–2 moles of a mineral acid per mole of α-nitroolefin and thereby producing the oxime.

2. Process according to claim 1, wherein said α-nitroolefin is 1-nitrocyclooctene.

3. Process according to claim 1, wherein said acid is present in an amount of from about 0.1 to 1.0 mol per mol of α-nitroolefin.

4. Process according to claim 1, wherein said lower alkanol is methanol.

5. Process according to claim 1, wherein said α-nitroolefin is of up to and including 20 carbon atoms.

6. Process according to claim 1, wherein said α-nitroolefin is an alicyclic compound of up to and including 12 carbon atoms.

7. Process according to claim 1, wherein said mineral acid is hydrochloric acid.

References Cited in the file of this patent

UNITED STATES PATENTS

| | | |
|---|---|---|
| 2,233,823 | Susie | Mar. 4, 1941 |
| 2,427,822 | Tindall | Sept. 23, 1947 |
| 2,483,201 | Hurd | Sept. 27, 1949 |

OTHER REFERENCES

Bouveault et al.: Comptes rend., vol. 134, pp. 1145–1147 (1902).

Nightingale et al.: J.A.C.S. vol. 66, pp. 352–354 (1944).